United States Patent
De Vriendt

(10) Patent No.: US 6,532,236 B1
(45) Date of Patent: Mar. 11, 2003

(54) METHOD AND ARRANGEMENT FOR TRANSMISSION OF DATA IN A MOBILE NETWORK

(75) Inventor: Johan Andre De Vriendt, Afsnee (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/315,947

(22) Filed: May 21, 1999

(30) Foreign Application Priority Data

Jun. 2, 1998 (EP) .............................. 98401311

(51) Int. Cl.⁷ ................................. H04Q 7/24
(52) U.S. Cl. .............. 370/395.1; 370/395.51; 370/395.6
(58) Field of Search ................ 370/458, 468, 370/338, 345, 346, 352–357, 389, 331, 333, 395.1, 396, 395.3, 395.6, 395.51, 395.63, 400, 401, 412, 506; 455/466, 41

(56) References Cited

U.S. PATENT DOCUMENTS

| | | | | |
|---|---|---|---|---|
| 5,878,045 A | * | 3/1999 | Timbs ........................ | 370/466 |
| 5,953,651 A | * | 9/1999 | Lu et al. ..................... | 455/408 |
| 6,005,857 A | * | 12/1999 | Honkasalo et al. ......... | 370/337 |
| 6,049,543 A | * | 4/2000 | Sauer et al. ................. | 370/395 |
| 6,055,242 A | * | 4/2000 | Doshi et al. ................ | 370/458 |
| 6,108,546 A | * | 8/2000 | Kusaki et al. .............. | 455/436 |
| 6,108,560 A | * | 8/2000 | Navaro et al. .............. | 455/517 |
| 6,243,372 B1 | * | 6/2001 | Petch et al. ................. | 370/350 |
| 6,331,981 B1 | * | 12/2001 | Harth et al. ............. | 370/395.1 |
| 6,335,921 B1 | * | 1/2002 | Quinquis et al. ........... | 370/331 |

FOREIGN PATENT DOCUMENTS

GB 2 309 362 A 7/1997

OTHER PUBLICATIONS

Martin Johnsson et al, "Support for Low Bitrate Applications in ATM Networks", Proceedings of IFIP Workshop on Performance Modelling and Evaluation of ATM Networks, Jun. 3, 1996, pp. 39/1–39/14, XP002045906.

D. Raychaudhuri, "ATM Based Transport Architecture for Multiservices Wireless Personal Communication Networks", Serving Humanity Through Communications, Supercomm/ICC, New Orleans, May 1–5, 1994, vol. 1, May 1, 1994, pp. 559–565, XP000438976.

* cited by examiner

Primary Examiner—Nay Maung
Assistant Examiner—Jean A Gelin
(74) Attorney, Agent, or Firm—Sughrue Mion, PLLC

(57) ABSTRACT

For transmission of data frames (F1, F3) between a first mobile network element (BTS1, BTS2, BTS3) and a second mobile network element (TRAU) in accordance with the ATM (Asynchronous Transfer Mode) protocol, data frames (F1, F3) of different channels are split up in subframes (SF11, SF12, SF13; SF31, SF32, SF33), ordered and then embedded in respective minicells. Minicells (MC11, MC31) containing information of different channels are then combined into ATM cells (CELL) that are transferred between the first mobile network element (BTS1, BTS2, BTS3) and the second mobile network element (TRAU). In this way, transcoders in the second mobile network element (TRAU) can already start decoding data frames of several channels after receipt of the most urgent data which is contained in the first ATM cells (CELL).

14 Claims, 2 Drawing Sheets

METHOD AND ARRANGEMENT FOR
TRANSMISSION OF DATA IN A MOBILE
NETWORK

BACKGROUND OF THE INVENTION

The present invention relates to a method for transmission of data frames in a mobile network as defined in the non-characteristic part of claim 1, and a data embedding arrangement to carry out this method as defined in the noncharacteristic part of claim 2.

A method, and implicitly also an arrangement, for transfer of mobile voice and data frames in ATM (Asynchronous Transfer Mode) format is already known in the art, e.g. from the article 'Wireless ATM—Tales of a Marriage' from the author Jan Kruys. This article was published in the magazine 'Telecommunications' in February 1997. Therein, a rapid growth of the use of ATM technology in mobile networks is predicted because of ATM's adequateness for high-quality multimedia applications in comparison with alternative technologies. If ATM technology is used in the conventional way for transmission of data frames between a first and second element of a mobile network, for instance between a base transceiver station and a transcoding and rate adaptation unit of a GSM (Global System for Mobile Communications) network, each ATM cell contains an amount of data frames. Indeed, in the conventional way either a single mobile data frame is empacked in an ATM cell or several mobile data frames are empacked in AAL2 (ATM Adaptation Layer) minicells which are combined into ATM cells. The minicells which are combined in one ATM cell may come from different users/channels. In such a system, if mobile data packets from different channels are to be transferred nearly simultaneously from the first to the second mobile network element, a very high peak cell rate is required to be able to respect delay requirements for all these channels. The basic reason for this technical problem is related to the synchronisation on the radio interface where all data coming from all channels is received nearly at the same time (within the same TDMA frame), and in order to avoid different delays for different users a quite high peak cell rate is required when conventional transport mechanisms are used.

SUMMARY OF THE INVENTION

An object of the present invention is to provide a method and arrangement of the above known type, but which enable to respect delay requirements for different channels without the need for additional network resources (additional bandwidth to obtain high peak cell rates).

According to the invention, this object is achieved by the method defined in claim 1 and the data embedding arrangement defined in claim 2.

Indeed, not all information of a mobile data frame has to be available at the receiving mobile network element to start decoding the data frame. Each data frame therefor can be split up at least in a first subframe containing data which have to be available in the second mobile network element to start decoding the data frame, and a second subframe containing data which may arrive later at the transcoder in the second mobile network element to continue decoding the data frame. The first subframes of different channels are embedded in minicells which are combined into ATM cells so that the transcoders of the different channels can already start decoding the data frames of several channels upon receipt of a single ATM cell. In this way, network resources are used more optimally since delay requirements of several channels can be respected without provision for additional bandwidth.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An advantageous implementation of the present invention is defined by claim 3.

In this way, by adaptively ordering minicells of different channels depending for example on the activity of these different channels, an increased performance is obtained without provision for additional network resources.

Another additional advantageous feature of the data embedding arrangement according to the present invention is defined by claim 4.

The use of minicells with different lengths provide an even more increased performance because the lengths of the minicells, if well-selected, are suitably adapted to the subframes to be embedded therein.

A data embedding arrangement as defined in claims 2, 3 or 4 may form part of a base transceiver station or a transcoding and rate adaptation unit of a GSM (Global System for Mobile Communications) network, as is indicated by claims 5 and 6 respectively. The transcoding and rate adaptation unit may be integrated as a server within the base station controller or mobile switching center as indicated by claims 7 and 8 respectively. The mobile switching center will only be influenced if the transcoding and rate adaptation unit functionality is moved to after the mobile switching center (this is not the case in GSM but might be the case in UMTS) or in case of transcoder free operation which will be introduced in GSM and UMTS (Universal Mobile Telecommunication System).

BRIEF DESCRIPTION OF THE DRAWING

The above mentioned and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
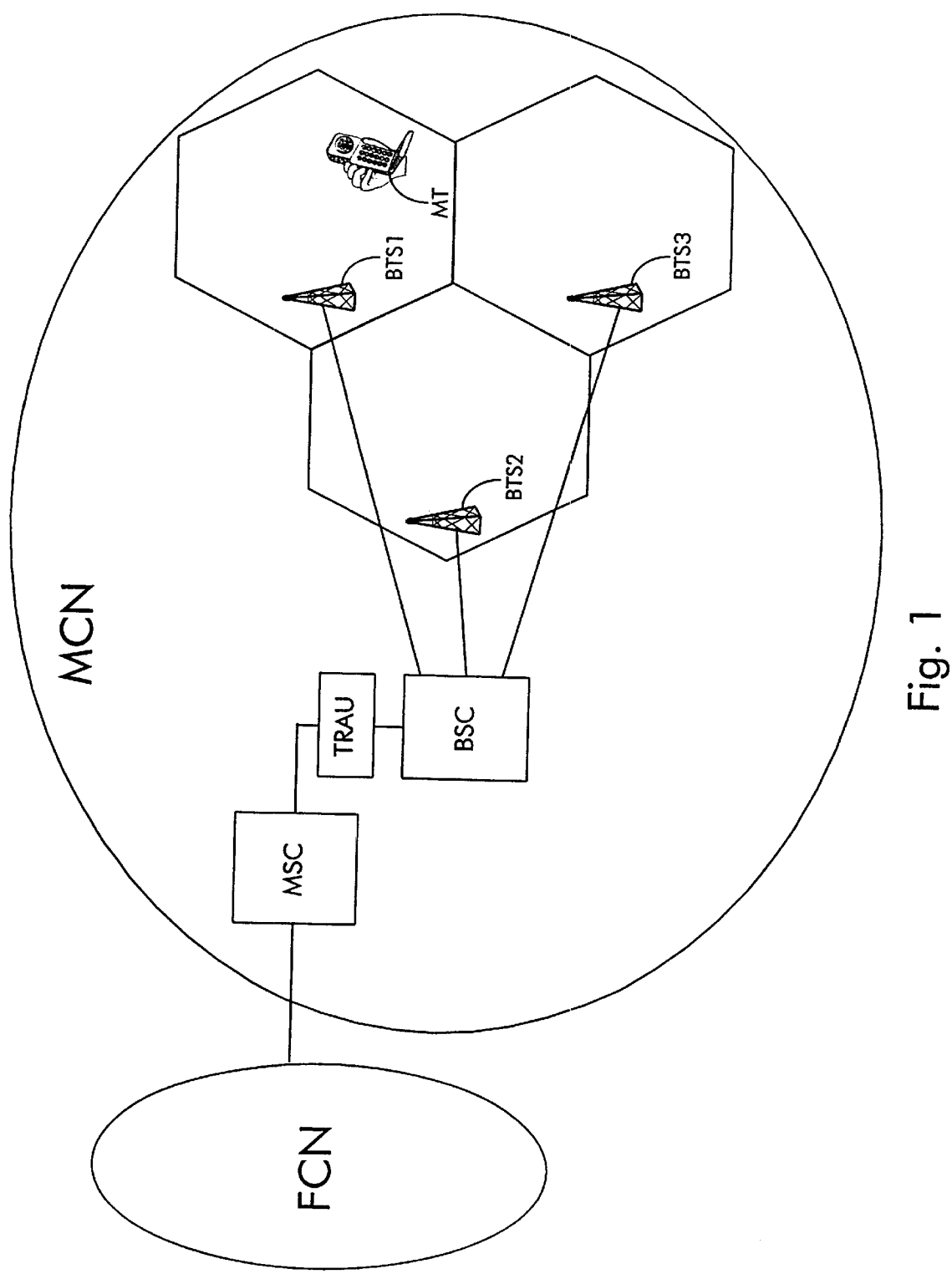
FIG. 1 illustrates a mobile communication network MCN wherein the present invention is applied.

The mobile communications network of FIG. 1 includes three base transceiver stations, BTS1, BTS2 and BTS3, all coupled to a base station controller BSC. The base station controller BSC is connected to a transcoding and rate adaptation unit TRAU, and the transcoding and rate adaptation unit TRAU is connected to a mobile switching centre MSC via whom the mobile communications network MCN is coupled to a fixed communications network FCN. Alternatively, the transcoding and rate adaptation unit TRAU could also be a server attached to either the base station controller BSC or mobile switching center MSC. Via the mobile communications network MCN and fixed communications network FCN, a mobile terminal MT can communicate with another mobile terminal or a fixed terminal.

Because of ATM's flexibility and its capability to support a wide range of services, including high quality multimedia applications, the tendency is to use the ATM (Asynchronous Transfer Mode) protocol for transmission between a base transceiver station, BTS1, BTS2 or BTS3, and the base station controller BSC, between a base station controller BSC and the transcoding and rate adaptation unit TRAU, and between the transcoding and rate adaptation unit TRAU and the mobile switching centre MSC. This means that speech or data frames originating from several mobile terminals or destined to several mobile terminals have to be embedded first in AAL2 (ATM Adaptation Layer 2) minicells and then several AAL2 minicells in ATM cells to be transferred between the mobile network elements BTS1, BTS2, BTS3, BSC, TRAU and MSC. According to the present invention, parts of speech frames will each be embedded in an AAL2 minicell and minicells containing parts of speech frames of different mobile terminals will be grouped into a single ATM cell. Thereto, the base station controller BSC and transcoding and rate adaptation unit TRAU are equipped with a speech frame embedding arrangement as drawn in FIG. 2. The base transceiver station BTS1 and transcoding and rate adaptation unit TRAU need this splitting, ordering and embedding functionality. The base station controller BSC and mobile switching center MSC only need AAL2 functionality, which they also need in case of conventional use of AAL2. There might be some impact on e.g. handover functionality because of the fact they don't deal with speech subfromes instead of speech frames.

Figure 2:
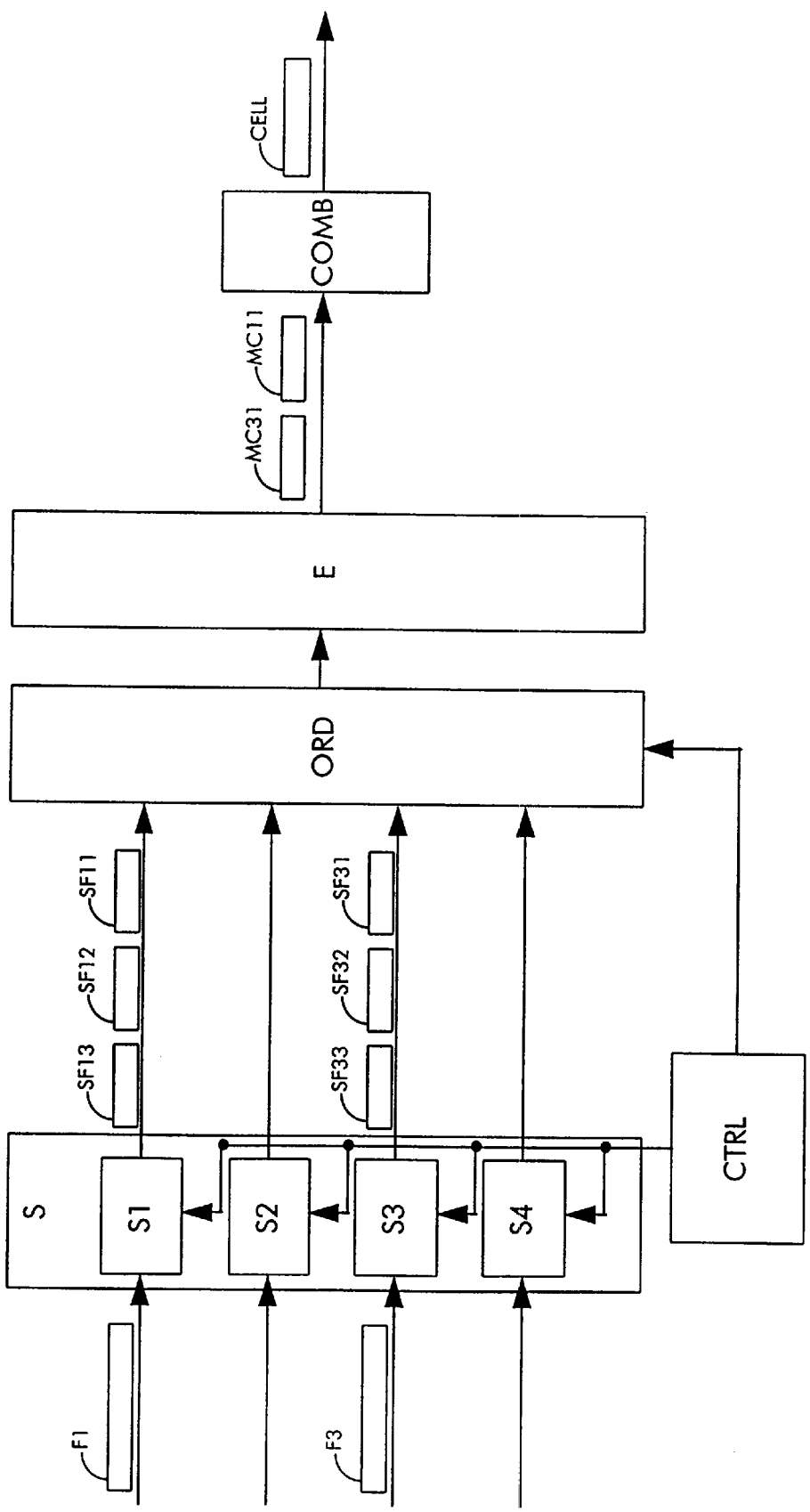
FIG. 2 is a block scheme of a preferred embodiment of the data embedding arrangement according to the present invention.

The speech frame embedding arrangement of FIG. 2 includes a bank S of speech frame splitters, S1, S2, S3 and S4, a subframe ordering device ORD, a minicell embedders E, and a minicell combining device COMB.

Each speech frame splitter, S1, S2, S3 or S4, of the splitter bank S is coupled between a channel input of the arrangement and an input of the subframe ordering device ORD. The subframe ordering device ORD has an output coupled to an input of the minicell embedder E and this minicell embedder E is coupled with an output to an input of the minicell combining device COMB. An output of the latter minicell combining device COMB serves as an output of the whole arrangement.

Speech frames F1 and F3 of different channels, typically having a length of 20 milliseconds, arrive at different channel inputs of the arrangement drawn in FIG. 2. If the arrangement is used in base transceiver station BTS1 of FIG. 1 for instance, F1 may represent a speech frame received by base transceiver station BTS1 from mobile terminal MT whereas speech frame F3 may be a speech frame received by base transceiver station BTS1 from another mobile terminal not drawn in FIG. 1. The speech frames F1 and F3 are decomposed in subframes, SF11, SF12, SF13, and SF31, SF32, SF33, by the speech frame splitters S1 and S3 respectively. Speech frame splitter S1 splits speech frame F1 into an urgent subframe SF11, i.e. a subframe containing information that is required at the decoder's side to start the decoding of speech frame F1, and two non-urgent subframes, SF12 and SF13, containing parts of speech frame F1 that may arrive later to continue the decoding of speech frame F1. In a similar way, speech frame splitter S3 splits speech frame F3 into an urgent subframe SF31 and two non-urgent subframes, SF32 and SF33. All subframes generated by the splitters S1, S2, S3 and S4 are supplied to the subframe ordering device ORD. This subframe ordering device ORD now orders the subfromes in the order wherein they should be combined into ATM cells. The subframes SF11 and SF31 containing urgent data of respectively the first and third mobile channel are first supplied by the subframe ordering device ORD to the minicell embedder E Afterwards the subframes SF12, SF32, SF13 and SF33 containing less urgent information are applied to the embedder E by the subframe ordering device ORD. The minicell embedder E has the task to embed the subframes in minicells one by one. In more detail, the minicell embedder E embeds the urgent subframe SF11 generated by speech frame splitter S1 into a first minicell MC11, the urgent subframe SF31 generated by speech frame splitter S3 into a second minicell MC31, and so on. The minicells wherein subframes are embedded by the minicell embedder E subsequently are supplied to the minicell combining device COMB. The minicell combining device COMB fills ATM cells with the minicells received from the embedder E and respects the order wherein the minicells arrive. In this way, a first ATM cell will be filled with urgent information from several mobile channels, whilst later filled ATM cells will contain less urgent information from different mobile channels.

The speech frame splitters S1, S2, S3 and S4 and the subframe ordering device ORD drawn in FIG. 2 operate under control of a control unit CTRL having outputs interconnected with control inputs of the speech frame splitters S1, S2, S3 and S4 and the subframe ordering device ORD respectively. Via instructions of the control unit CTRL, the length of the subframes SF11, SF12, SF13, SF31, SF32, SF33 wherein speech frames F1 and F3 are split up by the speech frame splitters S32, and S3, as well as the order wherein the subframes SF11, SF12, SF13, SF31, SF32 and SF33 are supplied to the minicell embedder E can be adapted.

It is noticed that for splitting the speech frames in subframes and ordering the subframes in the subframe ordering device ORD, several algorithms or criteria can be proposed to optimise efficiency, delay, or complexity of splitting speech frames and ordering subframes. Furthermore, the number of subframes wherein a speech frame is split up may be equal for all channels or may be different for different channels, the length of the subframes and as a consequence also the length of the minicells may be the same for all subframes or may be different, the order wherein urgent subframes of different channels are put into the first ATM cell may be adaptive to the activity of the different channels, and so on. It is however clear that all these choices that have to be made are rather implementation choices and it is clear that applicability of the present invention is not restricted to a particular choice of such implementation parameters.

It is further noticed that applicability of the present invention also is not restricted to a particular kind of mobile communications network. A person skilled in the art of mobile communications will be able to deduce from the above given explanation that the invention can be applied in a GSM (Global System for Mobile Communications) network, a DECT (Digital Enhanced Cordless Telecommunications) network, a DCS (Digital Communications System) network, a UMTS (Universal Mobile Telecommunications System) system or any other kind of mobile communications network, and will be able to modify the above described arrangement in such a way that it can be integrated in such network.

Furthermore, it is remarked that the principles of the present invention are illustrated by describing the operation of the functional blocks of the arrangement drawn in FIG. 2. Each block drawn in this figure is described by explaining the functions it performs rather than by the electronic components it contains. From the given functional description however, any person skilled in the art of designing electronic components can develop detailed electronic circuitry realising these functions. For this reason, no further details with respect to the electronic components of the blocks were given.

While the principles of the invention have been described above in connection with specific apparatus, it is to be clearly understood that this description is made only by way of example and not as a limitation on the scope of the invention.

What is claimed is:

1. A method for transmission of data frames of different channels between a first mobile network element and a second mobile network element via the ATM (Asynchronous Transfer Mode) protocol, the method comprising:

splitting each data frame into a plurality of subframes;

embedding said subframes in respective minicells, each of said minicells containing one subframe;

forming an ATM cell containing a plurality of said minicells containing data of different channels; and transmitting said ATM cell to said second mobile network.

2. The method according to claim 1, wherein said subframes include urgent subframes containing information that if required to begin decoding of said data frames and non-urgent subframes containing portions of said data frames that may arrive later to continue decoding of said data frames.

3. The method according to claim 2, wherein a first formed ATM cell contains information from said urgent subframes and later formed ATM cells contain information from said non-urgent subframes.

4. A data embedding arrangement according to claim 3, wherein said arrangement further comprises ordering means coupled between said splitting means and said embedding means, and adapted to re-order said subframes so that said urgent subframes precede said non-urgent subframes.

5. A data embedding arrangement according to claim 3, wherein said combining means combines said minicells containing data of different channels into an ATM cell so that a first formed ATM cell contains information from said urgent subframes and later formed ATM cells contain information from said non-urgent subframes.

6. A data embedding arrangement for use in a mobile communications network wherein data frames of different channels are transferred between a first mobile network element and a second mobile network element via the Asynchronous Transfer Mode (ATM) protocol, said arrangement comprising:

splitting means adapted to receive said data frames and to split each data frame into a plurality of subframes;

embedding means coupled to said splitting means and adapted to embed said subframes in respective minicells, each of said minicells containing one subframe; and combining means coupled to said embedding means and adapted to combine said minicells containing data of different channels into an ATM cell for transmission to said second mobile network element.

7. A data embedding arrangement according to claim 6, wherein said arrangement further comprises ordering means coupled between said splitting means and said embedding means, and adapted to re-order said subframes.

8. A data embedding arrangement according to claim 6, wherein said minicells may have different lengths.

9. A base transceiver station of a mobile communications network, wherein said base transceiver station comprises a data embedding arrangement as defined in claim 6.

10. A transcoding and rate adaptation unit of a mobile communications network, wherein said transcoding and rate adaptation unit comprises a data embedding arrangement as defined in claim 6.

11. A base station controller of a mobile communications network, wherein said base station controller comprises a transcoding and rate adaptation unit as defined by claim 10.

12. A mobile switching center of a mobile communications network, wherein said mobile switching centre comprises a transcoding and rate adaptation unit as defined by claim 10.

13. The method according to claim 12, further comprising the step of rearranging the order of said subframes so that said urgent subframes precede said non-urgent subframes prior to the step of embedding said subframes in respective minicells.

14. A data embedding arrangement according to claim 6, wherein said subframes include urgent subframes containing information that is required to begin decoding of said data frames and non-urgent subframes containing portions of said data frames that may arrive later to continue decoding of said data frames.

* * * * *